Patented Oct. 29, 1929

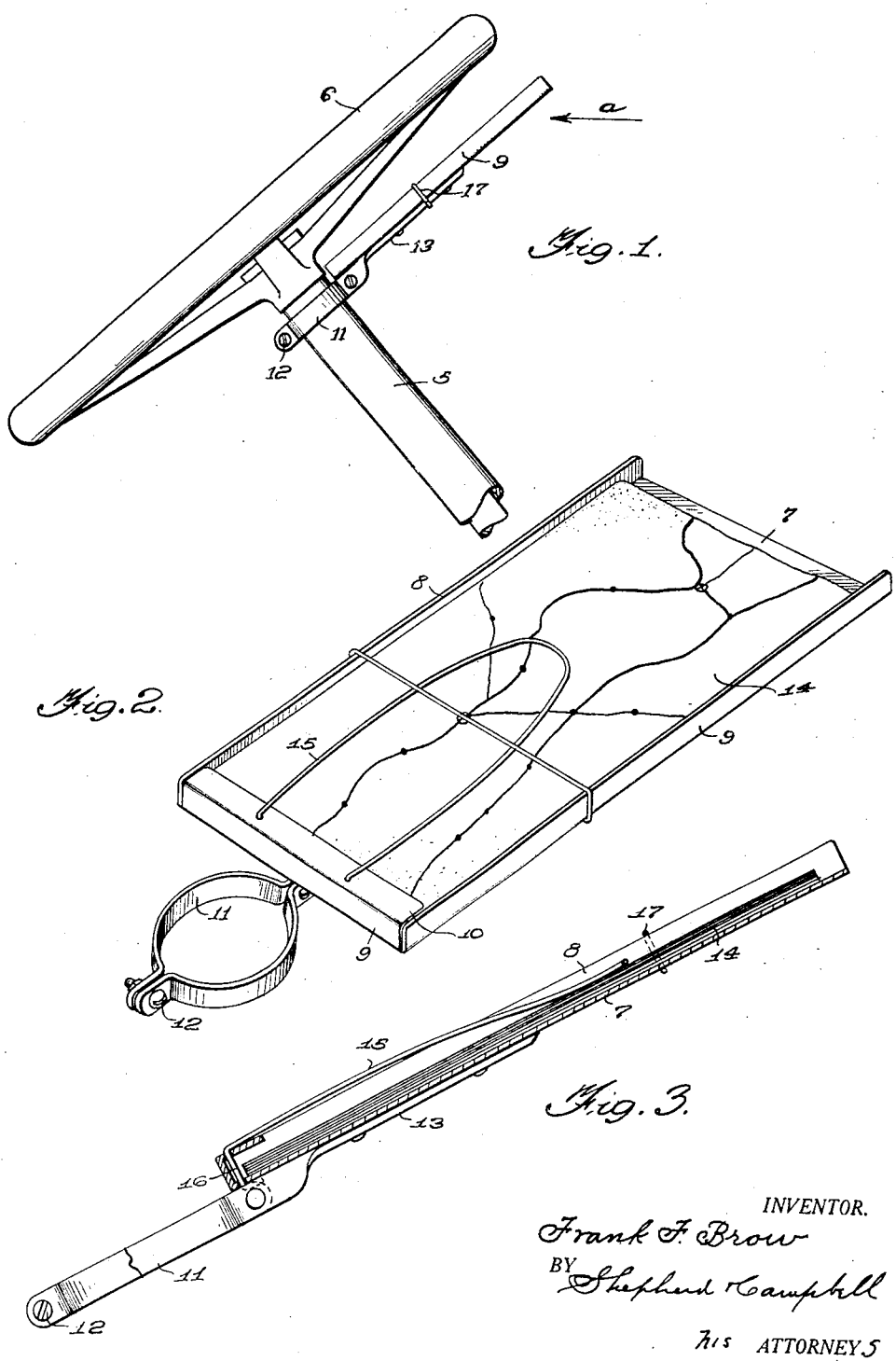

1,733,293

UNITED STATES PATENT OFFICE

FRANK F. BROW, OF HARTFORD, OHIO

MAP SUPPORT FOR MOTORISTS

Application filed August 20, 1928. Serial No. 300,938.

This invention relates to a map support for motorists, and it has for its object to provide improved means for holding a map in such position, with respect to the steering column and steering wheel of a motor vehicle, that the driver may inspect the map, from time to time, without having to turn his head in such a manner as to interfere with his maintenance of the view of the road ahead, and of the traffic thereon.

It is a further object of the invention to provide a holder of such a nature as to maintain a map in such position, and in such condition, that it cannot be blown out of place by the wind, even though the windshield be open.

It is a further object of the invention to provide a holder of the character indicated, provided with a movable indicating means of great simplicity and economy, which serves the double function of indicating to the driver, at a glance, that portion of the map in which he is particularly interested at that moment, and of aiding in holding the map in the holder.

Further objects and advantages of the invention will be set forth in the detailed description which follows.

In the accompanying drawing:

Fig. 1 is a side view of the steering wheel and steering column of an automobile, and having the holder of the present invention applied thereto.

Fig. 2 is a perspective view of the holder, and

Fig. 3 is a vertical sectional view through the holder.

Like numerals designate corresponding parts in all of the figures of the drawing.

In the drawing, 5 designates the steering column, and 6 the steering wheel of an automobile. The holder of the present invention consists of a plate 7, preferably of stamped sheet metal. This plate has upturned sides 8, and a rear end comprising an upturned wall 9, and an overturned top flange 10. A clamp 11, adapted to be gripped upon the steering column 5, by screws 12, comprises a forwardly extending arm 13, which is secured to, and supports, the plate 7. It is to be noted that the clamp 11, and the plate 7, lie in substantial parallelism. Consequentlly, since this arrangement supports the plate 7 at right angles to the column, 5, it brings said plate into substantial parallelism with the under side of the steering wheel 6. In use, a paper map 14 is folded in such manner as to bring that portion of the country through which the motorist happens to be passing, uppermost, and said map is then fitted into the holder between the side walls 8 and 9, and with its lower end portion beneath the overhanging wall 10. The map is held in this position by a U-shaped spring wire clip 15, the ends of which pass through the holder, as indicated at 16. A marker or indicator, which may be a simple rubber band 17, embraces the holder, extending entirely therearound. It is apparent that this rubber band may be readily shifted longitudinally along the holder, its function being to cause the eye of the driver to immediately go to that portion of the map indicating the locality through which he happens to be passing at the time. Thus, the driver need glance at the map but a moment, and need not divert his gaze from the roadway for more than a very brief space of time.

With the windshield open, the direction of the air current would be as indicated by the arrow $a$ (Fig. 1), and it will be seen that the holder, when held at right angles to the steering wheel, lies in such position as to protect the map from the wind and, consequently, from being blown about. There are several features which contribute to the holding of the map firm and steady, as follows: First, the map is protected from the wind by the inclination of the holder; second, the map is rendered relatively heavy and stiff itself by being folded; third, the map is engaged by the spring clamp 15, and fourth, any tendency of the map to lift out of the holder would be additionally resisted by the presence of the band 17.

From the foregoing description, it will be seen that an exceedingly economical, but, at the same time, very efficient map holder for automobiles has been produced by my invention.

It is to be understood that the invention is not limited to the precise construction set forth, but that it includes within its purview whatever changes fairly come within either the terms or the spirit of the appended claims.

Having described my invention, what I claim is:

1. A device of the character described, comprising a flat plate, upturned side walls, and an inner end wall terminating in an overturned flange, which lies in spaced relation to the plate and substantially at the level of the top of the side walls, the whole forming a support for the reception of a map in folded condition, a resilient clamp consisting of a wire bent to U-form and adapted to overlie and exert pressure upon the folded map to hold the same in place upon the plate, the terminal ends of said clamp passing over the top of said overturned flange and downwardly through said flange, and through said plate, and lying close to the end wall so that the space beneath said flange is left substantially unobstructed in order that the thicknesses of the folded map may be fitted thereinto, and a clamp adapted to embrace the steering column of an automobile and rigidly connected with the underside of said plate, said clamp being so disposed as to support said plate substantially at right angles to the steering column of an automobile.

2. A device of the character described, comprising a flat plate having upturned side walls of a depth to house a map in folded condition, and an inner end wall terminating in an overturned flange, which lies in spaced relation to the plate and substantially at the level of the top of the side walls, a resilient clamp consisting of a wire bent to U-form and adapted to overlie and exert pressure upon the folded map to hold the same in place upon the plate, the terminal ends of said clamp passing over the top of said overturned flange and downwardly through said flange, and through said plate, and lying close to the end wall so that the space beneath said flange is left substantially unobstructed in order that the thickness of the folded map may be fitted thereinto, a clamp adapted to embrace the steering column of an automobile and rigidly connected with the underside of said plate, said clamp being so disposed as to support said plate substantially at right angles to the steering column of an automobile, and a marking band extending entirely around said plate and its side walls, and movable freely along said side walls, said band serving as a marker and as a means to prevent gusts of wind from blowing the folded map out of its position between said side walls.

In testimony whereof I affix my signature.

FRANK F. BROW.